US012803783B2

(12) United States Patent
Shaul

(10) Patent No.: US 12,803,783 B2
(45) Date of Patent: Nov. 17, 2026

(54) COMPRESSION AND DECOMPRESSION OF SPARSE VECTORS UNDER HOMOMORPHIC ENCRYPTION

(71) Applicant: International Business Machines Corporation, Armonk, NY (US)

(72) Inventor: Hayim Shaul, Kfar Saba (IL)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 18/903,096

(22) Filed: Oct. 1, 2024

(65) Prior Publication Data

US 2026/0095300 A1 Apr. 2, 2026

(51) Int. Cl.

*H04L 9/00* (2022.01)
*G06F 16/22* (2019.01)
*H04L 9/06* (2006.01)

(52) U.S. Cl.

CPC .......... *H04L 9/008* (2013.01); *G06F 16/2246* (2019.01); *H04L 9/0618* (2013.01)

(58) Field of Classification Search

None

See application file for complete search history.

(56) References Cited

U.S. PATENT DOCUMENTS

| | | | | |
|---|---|---|---|---|
| 8,775,495 | B2 | 7/2014 | Lumsdaine et al. | |
| 10,055,602 | B2 * | 8/2018 | Deshpande | H04L 9/002 |
| 10,541,805 | B2 * | 1/2020 | Laine | H04L 9/008 |
| 10,778,408 | B1 * | 9/2020 | Khedr | H04L 9/008 |
| 11,720,252 | B1 | 8/2023 | Heddes et al. | |
| 12,155,754 | B2 * | 11/2024 | Tueno | G06F 21/6245 |

(Continued)

FOREIGN PATENT DOCUMENTS

| | | | | |
|---|---|---|---|---|
| CN | 113254743 B | * 12/2022 | | G06F 16/909 |
| CN | 111026788 B | * 4/2023 | | H04L 9/085 |

(Continued)

OTHER PUBLICATIONS

Kushnir et al., "Secure Range-Searching Using Copy-And-Recurse", Proceedings on Privacy Enhancing Technologies 2024(3), 626-644, DOI:10.56553/popets-2024-0096, Jul. 2024, (Year: 2024).*

(Continued)

*Primary Examiner* — Piotr Poltorak

(74) *Attorney, Agent, or Firm* — Cantor Colburn LLP; Tihon Poltavets

(57) ABSTRACT

Mechanisms are provided for compressing ciphertext data for data transmission. A sparse vector is received, comprising a plurality of vector elements and a tree is built from the sparse vector where each leaf node corresponds to a vector element in the sparse vector, and each subsequent level of the tree is built from a child level below it in the tree. Nodes of a subsequent level have values determined based on values of child nodes connected to them. The mechanisms execute a level-based copy-and-recurse operation on the tree from a root node of the tree to leaf nodes of the leaf node level. The level-based copy-and-recurse operation computes, at each level of the tree, an indicator vector and a selection matrix that identifies which nodes to recurse into. The mechanisms generate the compressed ciphertext data based on the indicator vectors and the sparse vector.

20 Claims, 10 Drawing Sheets

(56) References Cited

U.S. PATENT DOCUMENTS

| | | | | |
|---|---|---|---|---|
| 12,231,531 | B2 * | 2/2025 | Moon | H04L 9/0618 |
| 2018/0183571 | A1 * | 6/2018 | Gajek | H04L 9/008 |
| 2023/0252010 | A1 | 8/2023 | Surti et al. | |
| 2023/0327847 | A1 * | 10/2023 | Moshkowich | H04L 9/008 380/28 |

FOREIGN PATENT DOCUMENTS

| | | | | |
|---|---|---|---|---|
| CN | 117373225 A | | 1/2024 | |
| CN | 113158087 B | * | 7/2024 | G06F 21/6227 |

OTHER PUBLICATIONS

Aathithan et al., "A Complete Binary Tree Structure Block Cipher for real-time multimedia", Science and Information Conference, Oct. 2013, (Year: 2013).*

Liu et al., "Decision Tree-Based Sensitive Information Identification and Encrypted Transmission System", Entropy (Basel). Feb. 7, 2020;22(2):192. DOI: 10.3390/e22020192. PMID: 33285967; PMCID: PMC7516615, Feb. 2020. (Year: 2020).*

Akavia, Adi et al., "Secure Data Retrieval on the Cloud: Homomorphic Encryption meets Coresets", IACR Transactions on Cryptographic Hardware and Embedded Systems, 2019 (2): Feb. 2019, 26 pages.

Bienstock, Alexander et al., "Batch PIR and Labeled PSI with Oblivious Ciphertext Compression", 33rd Usenix Security Symposium, usenix.org, https://www.usenix.org/system/files/sec24summer-prepub-1155-bienstock.pdf, Aug. 2024, 18 pages.

Carpov, Sergiu et al., "Another Compression Method for Homomorphic Ciphertexts", Conference: the 4th ACM International Workshop, DOI:10.1145/2898445.2898452, https://www.researchgate.net/publication/303515406, May 2016, 8 pages.

Choi, Seung G. et al., "Compressed Oblivious Encoding for Homomorphically Encrypted Search", CCS '21, https://eprint.iacr.org/2021/1199.pdf, Sep. 2021, 15 pages.

Fleischhacker, Nils et al., "Compressing Encrypted Data Over Small Fields", Cryptology ePrint Archive, https://eprint.iacr.org/2023/946.pdf, Jun. 2023, 15 pages.

Fleischhacker, Nils et al., "How to Compress Encrypted Data", Cryptology ePrint Archive, https://eprint.iacr.org/2022/1413.pdf, Oct. 2022, 21 pages.

Kushnir, Eyal et al., "Secure range searching using copy-and-recurse", Proceedings on Privacy Enhancing Technologies 2024, Issue 3, https://petsymposium.org/popets/2024/popets-2024-0096.pdf, Jul. 2024, 19 pages.

Piske, Lucas et al., "Batched Distributed Point Function from Sparse LPN and Homomorphic Secret Sharing", Cryptology ePrint Archive, https://eprint.iacr.org/2024/823.pdf, May 26, 2024, 35 pages.

* cited by examiner

Selection Matrix $\chi$: (1, 0, 1)

$$S_{2,3}(\chi) = \begin{pmatrix} 1 & 0 & 0 \\ 0 & 0 & 1 \end{pmatrix}$$

$$S_{3,2}(\chi) \cdot (a, b, c)^T = (a, c)$$

Selects the elements indicated by $\chi$

Inverse Selection Matrix $\chi$: (1, 0, 1)

$$Z_{3,2}(\chi) = \begin{pmatrix} 1 & 0 \\ 0 & 0 \\ 0 & 1 \end{pmatrix}$$

$$Z_{3,2}(\chi) \cdot (a, c)^T = (a, 0, c)$$

Selects the elements indicated by $\chi$

Algorithm 1: $Comp_{n,\xi}([[A]])$
Parameters: $n$, c, where $n$ is a power of 2.
Input: A c-sparse array $[[A]] = ([[A[1]]], \ldots, [[A[n]]]) \in R^n$.
Output: $[[c_1]], \ldots, [[c_\xi]] \in R$ $[[\chi 1]], \ldots, [[\chi(\log n - \lfloor \log c \rfloor)]] \in \{0, 1\}^{2c}$.

foreach $a = 1, \ldots, n$ do
{keep a binary indicator $node.\chi$ for each node, and for leaves also keep a value $node.v$}
$[[L0[a].\chi]] := isNonZero([[A[a]]])$
$[[L0[a].v]] := [[A[a]]]$
$r := \log n - \lfloor \log c \rfloor$
foreach $\ell = 1, \ldots, r$ do
foreach $a = 1, \ldots, n/2^\ell$ do
$[[L_\ell[a].\chi]] := [[L_{\ell-1}[2a-1].\chi]] + [[L_{\ell-1}[2a].\chi]] - [[L_{\ell-1}[2a-1].\chi]].[[L_{\ell-1}[2a].\chi]]$
Set $L_{\ell-1}[2a-1]$ as the left child of $L_\ell[a]$.
Set $L\ell{-1}[2a]$ as the right child of $L_\ell[a]$.
$[[L'r]] := [[Lr]]$
foreach $\ell = r, \ldots, 1$ do
$[[\chi e^{l\ell}]] = [[(L'_\ell[1].left.\chi, L'_\ell[1].right.\chi, \ldots, L'_\ell[c].left.\chi, L'_\ell[c].right.\chi)]]$
$[[S_\ell]] := BuildSelectionMatrix_{2c,c}([[\chi_\ell]])$
$[[L'_{\ell-1}]] := [[S_\ell]].[[(L'_\ell[1].left, L'_\ell[1].right, \ldots, L'_\ell[c].left, L'_\ell[c].right)]]$
Output $[[L'_0[1].val]], \ldots, [[L'_0[c].val]], [[\chi_r]], \ldots, [[\chi_1]]$

*FIG. 8*

Algorithm 2: $Decomp_{n,\xi}([[A'[1]]], \ldots, [[A'[\xi]]], [[\chi\log n - \lfloor \log c \rfloor]], \ldots, [[\chi_1]])$
Parameters: Same as of Algorithm 1.
Input: The input is the output of $Compn,\xi([[A]])$, where $A$ is a c-sparse array of size $n$.
Specifically the input is: $[[A'[1]]]$, $ldots$, $[[A'[c]]]$, where $A'[a] \in R$.
$[[\chi\log n - \lfloor \log c \rfloor]], \ldots, [[\chi_1]])$, where $\chi\log n - \lfloor \log c \rfloor, \ldots, [[\chi_1]] \in \{0, 1\}^{2c}$.
Output: $[[B]]$, where $B = A$.

Set $[[V_0[a].val]] := [[A'[a]]]$, for $a = 1, \ldots$, c.
$r := \log n - \lfloor \log c \rfloor$
foreach $\ell = 1, \ldots, r$ do
$[[Z_\ell]] := BuildExpansionMatrix_{2c,c}([[\chi_\ell]])$
$[[V'_{\ell-1}]] := [[Z_\ell]] . [[V_{\ell-1}]]$
Set $[[V'_{\ell-1}[2a-1]]]$ as the left child of $[[V_\ell[a]]]$
Set $JV'_{\ell-1}[2a]]]$ as the right child of $[[V_\ell[a]]]$
$[[B[b]]] :=$ the value of the $(b \bmod 2^r)$-th leaf in $Vr[\lceil b/r \rceil]$, for $b = 1, \ldots, n$
Output $B$

*FIG. 9*

COMPRESSION AND DECOMPRESSION OF SPARSE VECTORS UNDER HOMOMORPHIC ENCRYPTION

BACKGROUND

The present application relates generally to an improved data processing apparatus and method and more specifically to an improved computing tool and improved computing tool operations/functionality for performing compression and decompression of sparse vectors under homomorphic encryption.

Cybersecurity is a critical issue in modern computer environments. Each day, new reports are made of attackers breaching computer security measures and gaining access to private or confidential data, such as customer names, contact information, financial information, and the like. Moreover, increasing numbers of events are occurring where attackers infiltrate computing systems and hold the computing system or access to data hostage until a ransom is paid. Thus, improvements to the security of computing systems and data are an ever changing area of technology.

Security of data is especially a concern as individuals and organizations move from an on-site computing infrastructure and local applications/data based architecture to a more distributed and cloud infrastructure/service based architecture, where third parties are enlisted to store individual/organization data and perform processing of individual/organization data. At various points in the cloud architecture, e.g., if a cloud architecture performs data processing on unencrypted data, i.e., "in the clear", sensitive information may be leaked. This can be a significant issue as individuals and organizations rely increasingly on cloud architectures.

Homomorphic encryption (HE) mechanisms offer tools to help ensure security of data when using off-site, e.g., cloud based, services to perform operations on the data. HE provides mechanisms to perform certain operations on encrypted data without having to have access to the plaintext of the data.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for compressing ciphertext data for data transmission. The method comprises receiving a sparse vector comprising a plurality of vector elements. The method includes building a tree data structure from the sparse vector, wherein the tree data structure is built from a leaf node level in which each leaf node corresponds to a vector element in the sparse vector, and each subsequent level of the tree data structure is built from a child level below it in the hierarchy of the tree data structure, where nodes of a subsequent level have values determined based on values of child nodes connected to them from the child level of the subsequent level. Moreover, the method comprises executing a level-based copy-and-recurse operation on the tree data structure from a root node of the tree data structure to leaf nodes of the leaf node level. The level-based copy-and-recurse operation computes, at each level of the tree data structure, an indicator vector and a selection matrix that identifies which nodes to recurse into. Furthermore, the method comprises generating compressed ciphertext data based on the indicator vectors and the sparse vector, and transmitting the compressed ciphertext data to a computing device for execution of one or more operations on the compressed ciphertext data.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 8 is an example diagram illustrating an example algorithm for performing compression under homomorphic encryption/fully homomorphic encryption (HE/FHE) in accordance with one illustrative embodiment;

FIG. 9 is an example diagram illustrating an example algorithm for performing decompression under HE/FHE in accordance with one illustrative embodiment;

DETAILED DESCRIPTION

Figure 1A:
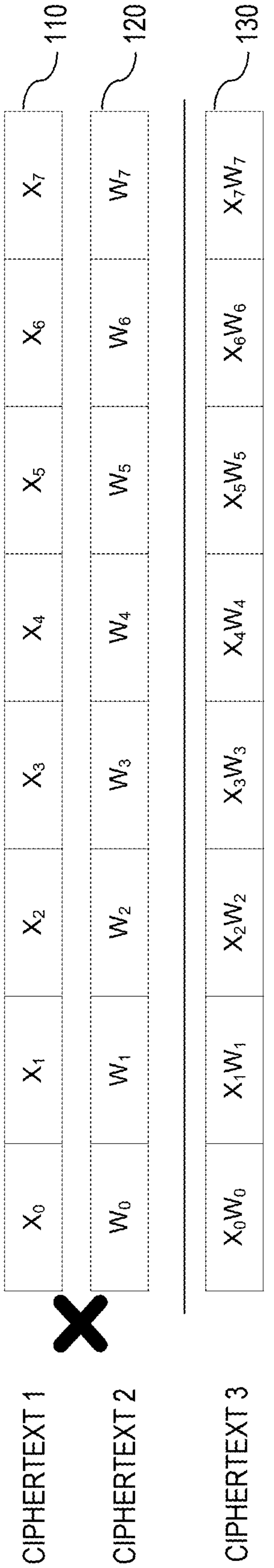
FIGS. 1A and 1B are diagrams illustrating slot-wise operations performed on example ciphertexts in a scheme that supports single-instruction-multiple-data (SIMD)

The illustrative embodiments provide an improved computing tool and improved computing tool operations/functionality for reducing data traffic in homomorphic encryption (HE) or fully homomorphic encryption (FHE) protocols when the input is sparse. In reducing data traffic in accordance with one or more of the illustrative embodiments, computationally and resource expensive communications and computations in HE and FHE are minimized, resulting in enhanced performance of the HE/FHE based system and its operations/functionality. The illustrative embodiments provide a specific solution to the problems of excessive data traffic and computations systems that operate on encrypted data, such as in HE/FHE based systems, where the specific solution implements an r-ary tree data structure, e.g., binary tree data structure, with leaves being an array that is to be encoded. The illustrative embodiments provide mechanisms that allow the information about the tree data structure, which needs to be communicated, to be reduced to a subset of leaf node ciphertexts and a small set of indicator vectors, rather than having to transmit a full set of leaf node ciphertexts regardless of whether or not the leaf node vector is known to be sparse or not. This results in less data traffic, shorter transmission times, and lower computational costs, as will be apparent from the following description.

The illustrative embodiments will be described with regard to example embodiments in which the mechanisms of the illustrative embodiments provide compression and decompression functionalities for sparse vectors used in HE/FHE protocols and HE/FHE computer operations. With the movement of modern computing systems to a more cloud-based architecture, often individuals and organizations are having their data stored and applications hosted by third-party cloud service and infrastructure providers. As such, it is desirable to ensure the privacy of the data both as the data is stored and as the data is processed by such cloud-based architectures. Hence, data providers may enlist HE/FHE protocols and architectures to encrypt their private data prior to providing the data to the cloud based storage systems and prior to providing the private data to cloud based services for processing. In some cases, the private data may be stored in cloud based storage systems in an encrypted form and processing is performed on the encrypted data from the cloud based storage system by other HE/FHE mechanisms that perform operations directly on the encrypted data. This ensures that the only entity having access to the unencrypted data is the data owner, i.e., the party providing the original data in the encrypted form.

For example, assume a cloud-based location service in which a user of a mobile device wishes to get information about the locations of XYZ store "nearby". In order to provide such information, the cloud-based location service must receive information regarding the mobile device's location and must have access to the data for locations of XYZ stores. This information may be sensitive in that the user of the mobile device may not want unauthorized parties to be able to track their location. Thus, the mobile device location data may be encrypted prior to transmission of the encrypted mobile device location data to the cloud-based location service. Moreover, in some cases, the data stored in the cloud based database may also have a sensitive nature, e.g., the XYZ store owner may have sensitive data that they also do not want disclosed to other parties or the user of the mobile device may not want other parties knowing their searches for information by having access to the results data. Thus, the database of data may also, or alternatively, be stored in the cloud in an encrypted form.

To ensure that this data remains secure, HE/FHE mechanisms may be implemented to perform operations on the encrypted data to provide the requested service without having to decrypt the data, i.e., providing the listing of "nearby" XYZ store locations. HE/FHE is an encryption protocol or architecture in which certain operations, such as additions and multiplication, can be applied on encrypted messages (data) without having to decrypt the messages first. This allows any algorithm to be implemented under HE/FHE by transforming the algorithm to a series of additions and multiplications. Unfortunately, it is inefficient to implement branching, i.e., making a decision that depend on the inputs, under HE/FHE as the encryption of the messages makes it impossible to know the content of the messages without decrypting them. As HE/FHE's intent is to not expose the unencrypted messages (data), it is an undesirable solution to decrypt the messages to perform branching under an HE/FHE architecture. However, such branching operations are ubiquitous in modern applications and hence, HE/FHE protections may be limited or inefficient with regard to computation complexity and time, computation resources utilized, and data traffic.

Moreover, many times with HE/FHE and other applications, it is desirable to transmit or store a sparse binary vector, e.g., a vector having vector slots where the value in the vector slot is either 1 or 0 depending on whether the corresponding data, e.g., ciphertext, meets specified criteria. For example, the sparse vector may be the result of a database search, where the vector slots have values (e.g., 1 or 0) that are indicators of records of a database that match a specified filter criteria of the database search, e.g., the vector has a vector slot for each database record and the vector slot value is equal to 1 for those records that match the filter criteria and 0 for those that do not. The vector may be "sparse" in that only a small subset of the vector slots indicate that the filter criteria are satisfied, i.e., there may be many records in the database, but very little that match a given filter's criteria.

As an example, taking again the scenario of the cloud-based location services, the database, which may store encrypted data, may be separate from the cloud-based location service and thus, the database search must be performed remotely from the cloud-based location service on the database. It can be appreciated that there may be many locations of the XYZ store, especially with international organizations, franchises, and the like, but only a small number of these locations meet the filter of "nearby" with regard to the particular location of the mobile device, e.g., only a small number of XYZ stores are within 10 miles of the mobile device, yet there may be many hundreds or thousands of XYZ store locations. As at least a portion of the data upon which the operation for determining "nearby" store locations is encrypted, e.g., the mobile device location and/or the database is encrypted, it is not possible for HE/FHE operations to perform their operations only on the records of the database that meet the filter criteria, i.e., it is not known ahead of time which records match the filter criteria. As a result, the HE/FHE operations have to be performed on all the records of the database, even though only a small number actually meet the filter criteria, i.e., the vector of results includes only a small number of vector slots with usable data, e.g., for the locations that are "nearby". This may require not only additional HE/FHE operations, but also the transmission of a large amount of encrypted data both in the performance of the cloud-based location service and also in providing results back to the user of the mobile device requesting the location services.

The illustrative embodiments provide an improved computing tool and improved computing tool operations/functionality to compress a sparse vector, e.g., search results or other filtering results, under HE/FHE in a way that can be also be decompressed under HE/FHE. The compression reduces the amount of data traffic required to perform HE/FHE operations and thus, reduces data network bandwidth requirements, computation requirements, and increases the speed of HE/FHE operations by reducing the amount of time required to complete the computations through focusing them on only a subset of elements of the sparse vector. Other works deal with sparse vectors by assuming that decryption is performed to generate plaintext upon which operations are performed. However, in the illustrative embodiments, such an assumption is not made, and the compression and decompression of the illustrative embodiments are performed without decrypting to plaintext.

With the mechanisms of the illustrative embodiments, the elements of a vector, e.g., a binary vector value indicating whether a corresponding ciphertext meets a given criteria, are represented as the leaves of a r-ary tree data structure, where r is 2 in the case of a binary tree (the non-limiting example used herein for illustration purposes). With the sparse binary vector example above, it is known that the vector has a maximum number of elements that are non-zero, i.e., that meet a given criteria. For example, the query, e.g., a Structured Query Language (SQL) query, can specify a "LIMIT" statement in which the querier limits the number of results they request. In the above example, where the querier is searching for a nearby location of the XYZ store, the store-chain owner can give a bound on how many stores can be identified as near a query coordinate. This can be done if one limits the definition of "nearby" to at most X miles away, e.g., X=10, from the querier for example, and one analyzes a database to verify what is the maximal number of stores that are X miles away from a single point, e.g., for any geographic point, there is at most Y number of stores within the X geographic range. Thus, there are various ways to limit the number of results returned, but in each case, it can be determined what the maximum number of elements returned will be, and these will be the maximum number of non-zero elements.

The illustrative embodiments operate to set a value in each inner node from the leaf nodes, that indicates whether there is a non-zero leaf in its subtree. Thus, the binary tree is built upwards from the leaf nodes until reaching a root node. That is, each ciphertext of the vector corresponds to a leaf node and has either a non-zero value (e.g., 1 in the depicted examples, where "1" represents the ci) or a zero value. At the next level up from the leaf node level of the binary tree, each pair of leaf nodes has a corresponding inner node. That inner node has a value that is either "1" if either or both of the nodes below it is "1", or has a value of "0" if neither node below it is "1". This process continues up the binary tree to the root node.

Once the binary tree is built from the vector in this bottom-up manner, a copy-and-recurse operation is performed in which the binary tree is traversed from the root node to the non-zero leaf nodes of the binary tree. The copy-and-recurse operation is one in which a recursive plaintext algorithm, A, traverses a tree data structure T and computes a function f on nodes it visits, such that: (1) T is a full r-ary tree, i.e., each inner node has r children (r=2 for a binary tree as one example); and (2) the algorithm A continues in at most c nodes at each level, where c is the number of non-zero leaves, i.e., non-zero elements in the input array (only c leaves are visited, which also means that the number of ancestors at each level is also bounded by c since every inner node visited eventually leads to at least one non-zero leaf). Hence the tree data structure T can be traversed under HE/FHE such that f is applied only a sub-linear number of times. It is noted that the HE/FHE version of the algorithm A has a linear overhead because it still needs to consider all the nodes in T. Although applying the transmission function as many times as the plaintext algorithm, it is noted that the HE/FHE version of algorithm A has a linear computation overhead because it still needs to consider all the nodes in T, however this is less costly than transmitting all of the tree data structure T (or even all the leaves). When visiting a node in the tree data structure T, an indicator vector is computed, under HE/FHE, where the indicator vector indicates which children need to be recursed into, i.e., the same process is repeated on such child nodes. There are at most c children that need to be recursed into. The indicator vector is used to construct a selection matrix to generate a copy of the c children, and the operation recurses into the copies of the c children. The selection matrix S € {0, 1} c*(r*c), is a matrix that selects elements of a vector. In the copy-and-recurse operation, where c nodes are visited in each level, there are log n iterations where in iteration x the operation considers all the nodes visited in level x and then computes which are the nodes that should be considered in the next iteration, i.e., the next level.

In the case of sparse vectors, it is known that at most c nodes in each level of the generated binary tree will need to be visited by the HE/FHE algorithms, i.e., at most c nodes in each level have a corresponding value of "1", and at each subsequent level, there are 2c potential nodes in the next level (of which still only c would need to be visited), due to the way the binary tree was constructed. For example, in the above scenario, it may be known ahead of time that c=10, meaning that at most there will be only 10 XYZ stores near a mobile device location at any location. This may be determined, for example, based on an analysis of XYZ store locations and determining that for any particular location, the maximum number of XYZ stores near each other is 10, or within a given range of a location is 10, e.g., there may be a policy in place that at most 10 XYZ stores are permitted to be within 10 miles of each other, for example. This value may be set based on empirical data or any other desirable means, but is a given input to the mechanisms of the illustrative embodiments.

Thus, at most c nodes will need to be visited, while the other nodes will not need to be visited by the HE/FHE algorithms as they will have "0" values, indicating that they do not meet the criteria of the particular filter. This is due to the fact that the original vector is a sparse vector in which the majority of the vector slot values are "0", i.e., c is much smaller than n (c<<n), where n is the total number of vector slots, e.g., c represents the maximum number of results that may be returned with regard to XYZ stores that are "nearby" (e.g., search results are limited to the top 10), whereas n represents the total number of XYZ stores.

At each level of the generated binary tree, the values of the nodes of that level represent an indicator vector (X) for recursion, which is used to build the selection matrix(S).

That is, under HE/FHE it is determined which children need to be recursed into and a binary vector $X=(X_1, \ldots, X_r)$ of r indicator bits is computed, where $X_i=1$ if and only if the operation needs to recurse into the i-th child. For example, when evaluating the criteria of a filter or search, for example, or any other type of branch, the children that are recursed into are those that meet the criteria of the filter, search, or branch operation.

The selection matrix S is built to generate, under HE/FHE, a copy of the children (and their subtrees) that need to be recursed into. Only copies of c<2c children are copied since at most c children need to be recursed into. Under HE/FHE, this is done by multiplying a vector of children, i.e., taking an entire subtree of each child and making a vector where each element is the encoding of a subtree (i.e., the indicators in the subtree), by the selection matrix S, which takes time at least linear in the tree size. After generating the selection matrix and using it to make copies of the children, the operation recurses into the copied child sub-trees by going back to the determination of which children need to be recursed into, building a new selection matrix, and repeating with the root of each sub-tree. This process is repeated until the leaf node level is reached. Thus, at each level it is determined which nodes to recurse into in the next level by computing the value of a comparison and then multiplying by a selection matrix to copy that sub-tree.

Hence, the copy-and-recurse operation allows an algorithm, e.g., plaintext algorithm A, to be run under HE/FHE such that the additional work for HE/FHE is performed on the same number of noes as the plaintext algorithm. The extra costs of running under HE/FHE with copy-and-recurs is only the cost of multiplying by a selection matrix S.

With the mechanisms of the illustrative embodiments, the indicator vectors X for each level of the tree may be transmitted rather than having to transmit the ciphertexts for each node. The selection matrix S with a vector of children node values provides an indication of which child nodes need to be visited. Thus, with a combination of the level indicator vectors X and the leaf node values, e.g., the original vector, it can be determined which nodes of the binary tree need to be processed using HE/FHE computations and which nodes can be effectively skipped, thereby saving computation time and resources. Moreover, the size of the indicator vectors and leaf node vectors are substantially smaller than that of the ciphertexts which would otherwise need to be transmitted in the case of systems where the illustrative embodiments are not implemented and HE/FHE would be performed on each node of the tree since it is not known which nodes meet the criteria of the original request. That is, the illustrative embodiments enable a small communication size for HE/FHE operations that involves only c leaves and log n indicator vectors, giving a total size of O(c log n).

Moreover, the illustrative embodiments also provide operations to generate an inverse selection matrix that is used to decode the indicator vectors and original leaf node vector to recreate the binary tree under HE/FHE. The inverse selection matrix is used to traverse the tree from the small subset of leaves upwards where at each level the inverse selection matrix is applied to generate the next higher level of the binary tree. Thus, the copy-and-recurse operation is modified in the step where the selection matrix is generated and instead generates an inverted selection matrix. The decoding step takes the inverted selection matrices and reconstructs the binary tree from the leaves upwards. Since the decoding step involves only matrix vector multiplications, it is efficient for implementation under HE/FHE operations.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides mechanism to reduce data traffic and computations on encrypted data, e.g., HE/FHE computations, in the presence of sparse vector inputs. The improved computing tool and improved computing tool operations/functionality provide an improved compression and decompression mechanism for sparse vectors, which in one or more of the illustrative embodiments, is implemented specifically with regard to HE/FHE. These mechanisms cannot be practically performed by human beings either outside of, or with the assistance of, a technical environment, such as a mental process, organization of human activity, or the like. The improved computing tool provides a practical application of the methodology at least in that the improved computing tool is able to compress sparse vector data, as well as decompress this sparse vector data, under HE/FHE protocols for efficient performance of HE/FHE operations, such as in the case of branches, filters, searches, or other conditional logic that is to be performed under HE/FHE with regard to encrypted data.

As mentioned above, in some illustrative embodiments, the present invention provides an improved computing tool and improved computing tool operations/functionality that reduces data traffic for performing homomorphic encryption (HE) or fully homomorphic encryption (FHE) operations. HE/FHE schemes allow users, e.g., clients, to evaluate any "circuit" on encrypted data, where the "circuit" is the group of computations or calculations that are to be performed on the encrypted data using HE/FHE. HE is the broader class of schemes with a primary difference between HE and FHE being that HE may operate on low degree polynomials over encrypted data and has some limitations due to noise buildup, while FHE allows more complex computations and does not have the same limitations due to noise buildup as HE does. For purposes of the present description, HE and FHE are used interchangeably herein and the illustrative embodiments are applicable to either one of HE or FHE, or other schemes and protocols in which operations are performed on encrypted data without decrypting the data in order to perform the computations.

With regard to an HE/FHE circuit, as an example, one may want to perform a particular operation on input data, where this operation may require a plurality of HE/FHE (simply "HE" hereafter) computations to be performed in series and/or parallel to ultimately generate one or more results corresponding to the requested operation. These HE computations may be represented as a graph of nodes and edges proceeding from inputs to one or more outputs with intermediate nodes and intermediate ciphertexts being generated as a result of the HE computations performed at the various stages along the graph. For example, edges in a graph may represent HE computations and nodes in the graph may represent ciphertexts. The combination of these nodes and edges may be considered a "circuit" that defines the various HE input ciphertext(s), the intermediate ciphertext(s), and the output ciphertext(s). These combinations of HE compute operations and resulting ciphertext(s) are referred to as a circuit as the operations of a circuit are not dependent on the particular inputs, e.g., there are no conditional operations, as the inputs are encrypted, and are performed on the inputs to the circuit, similar to classic electrical circuits.

With an HE scheme, a client, e.g., a user of a computing device, a computing process executing on a computing device, or the like (hereafter simply a "client"), can use the key generation method (Gen) to generate a pair of secret and public keys (sk, pk), where the "client" is a client to a HE service provider that provides an HE service, such as a cloud computing HE service or the like, via one or more computing systems, e.g., servers. The client stores the secret key (sk) and publishes the public key (pk).

Using the public key (pk), an untrusted entity can encrypt sensitive data (or a "message") $m_i$ by calling the encryption method (Enc), e.g., $c_i$=Enc_pk($m_i$). Subsequently, the client can ask the untrusted entity to execute the function c_res=Eval_pk(f, ($c_1$, . . . , $c_n$)) in order to evaluate a function f on some ciphertexts $c_i$ and store the results in another results ciphertext c_res. To decrypt c_res using the secret key (sk), the client calls the decryption method (Dec), e.g., m_res=Dec_sk(c_res), where m_res is the resulting decrypted message corresponding to the ciphertext c_res which has been decrypted using the secret key (sk). A HE scheme is correct when m=Dec(Enc(m)) and is approximately correct when m=Dec(Enc(m))+epsilon, for some relatively small epsilon. The "Eval" method receives an HE circuit and ciphertext(s) and evaluates the circuit with the given ciphertext(s) as inputs as to whether they are correct or not. "Eval" also receives an evaluation key which is different than the public key generated during the keygen phase.

Some HE schemes operate on ciphertexts in a homomorphic single instruction multiple data (SIMD) fashion. This means that a single ciphertext encrypts a fixed-size vector, and the homomorphic operations on the ciphertext are performed slot-wise on the elements of the plaintext vector, where "slot-wise" refers to each of the vector slots of the vector and means that the operations are performed on a vector slot by vector slot basis. For example, as shown in FIG. 1A, a first ciphertext 110 may be packed with a first vector of elements in one ciphertext, i.e., x0 to x7, where each element is in a vector slot. Similarly, a second ciphertext 120 may be packed with a second vector of elements in one ciphertext, i.e., w0 to w7. In the context of an HE operation, these elements are encrypted data. Addition and multiplication operations, for example, may then be performed on these ciphertext in a slot-wise manner so as to generate a result ciphertext 130, in which each vector slot of the ciphertext 130 comprises the product or sum of the corresponding vector slots of the first and second ciphertexts 110-120.

Figure 1B:
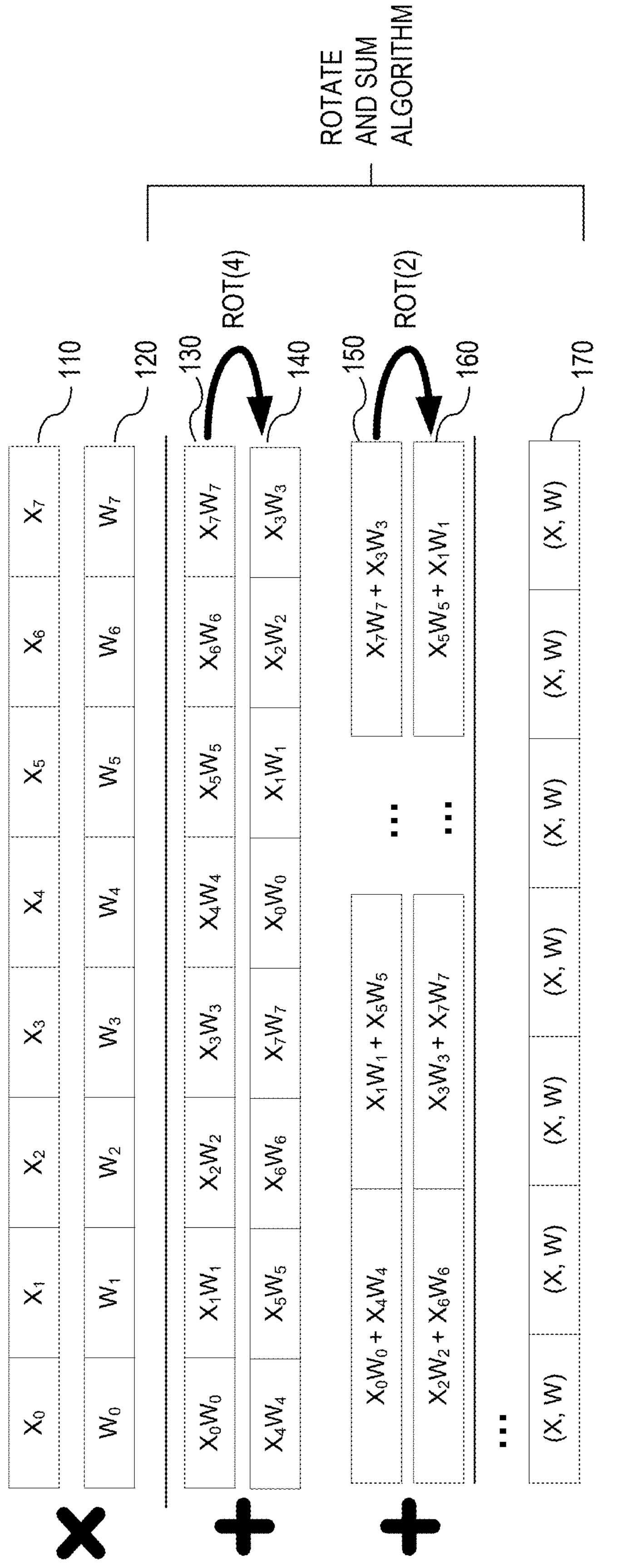

Other operations may be achieved by a combination of multiplication and addition operations with some rotation operations. Rotation operations rotate the vector slots by a specified number of vector slots, wrapping at the ends of the vectors. FIG. 1B illustrates a rotate and sum algorithm that is performed on the result vector 130 generated from the multiplication of the first and second ciphertexts (or vectors) 110-120. An operation such as that shown in FIG. 1B, may be used, for example, to obtain an inner product of the two ciphertexts 110-120. As shown in FIG. 1B, after obtaining the result ciphertext (or vector) 130 in the manner shown in FIG. 1A, a rotation of 4 slots, i.e., Rot(4), to obtain the rotated ciphertext 140 which is then added to the result ciphertext 130. Thereafter, a rotation operation of 2 slots is performed on the result ciphertext 150 is performed to generate the rotated ciphertext 160 which is then added to the result ciphertext 150. These are referred to as rotate and sum (RaS) algorithms, and will ultimately result in an output ciphertext 170 which may represent, for example, an inner product of the original input ciphertexts 110-120.

In some situations, the inputs to HE operations may be sparse vectors, such as in the case of searches, filters, branch operations, or the like, where conditional results are generated and only a relatively smaller subset of a larger set of potential matching results actually meet the criteria of the branch, filter, or condition of the conditional branch. The example previously mentioned above, with regard to identifying nearby locations of a particular establishment, e.g., XYZ stores, is one example of such a search involving filter criteria and for which only a small portion of a larger set of records are matching the filter criteria. Under traditional HE/FHE, because HE/FHE operations cannot skip records of the databases or nodes of the generated tree data structure, all of the records, e.g., ciphertexts, would need to be transmitted and processed under HE/FHE in order to address the request. The illustrative embodiments provide an improvement that compresses such data and provides a decompression mechanism that can be implemented under HE/FHE and thereby reduce data traffic, computation, and ultimately increase the speed of the HE/FHE operations in servicing the original request.

Figure 2:
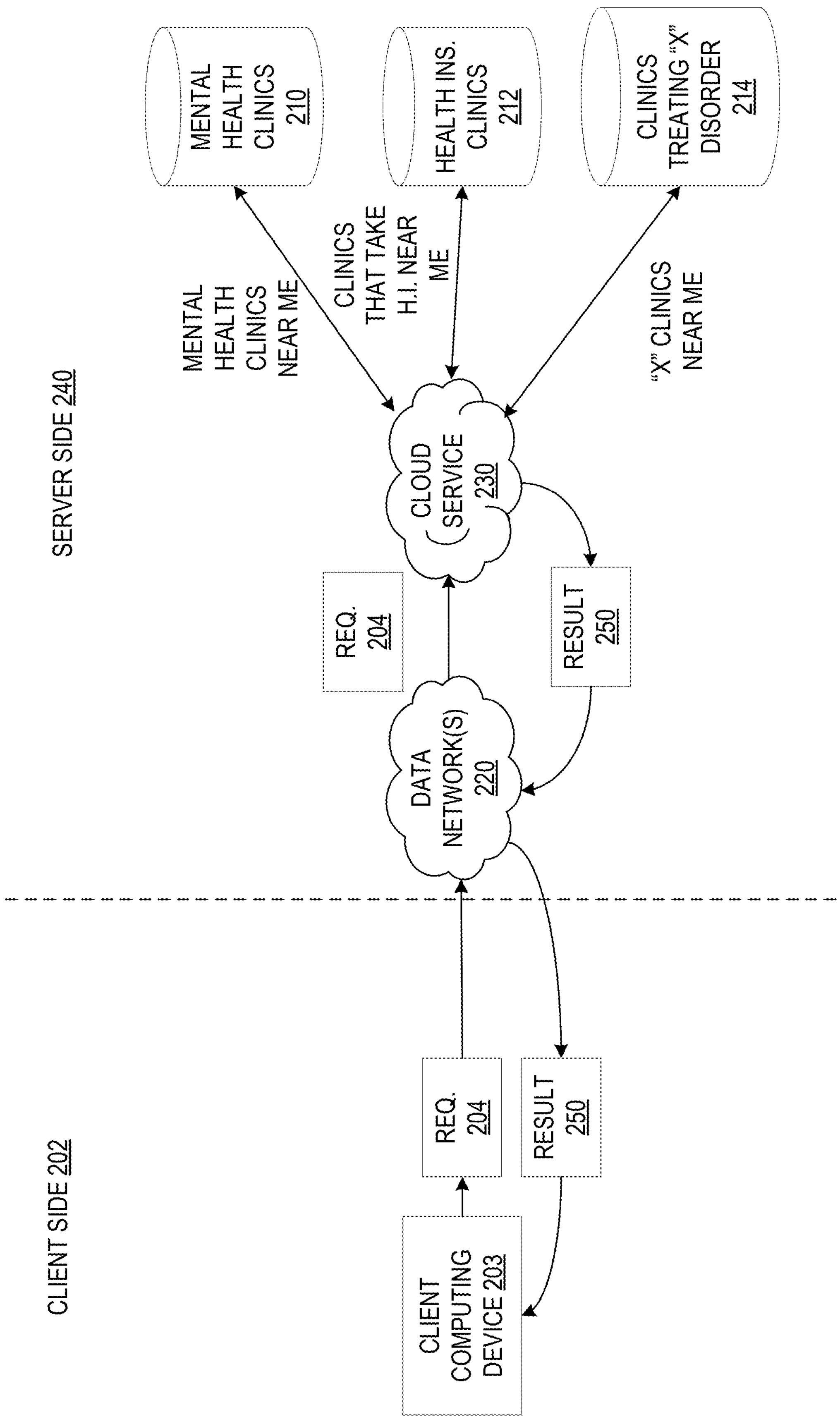
FIG. 2 is an example diagram of a homomorphic encryption (HE) operation in accordance with one illustrative embodiment where a filtering or search criteria is specified in an original request.

FIG. 2 is an example diagram of a HE operation in accordance with one illustrative embodiment where a filtering or search criteria is specified in an original request. As shown in FIG. 2, on a client side 202 of the HE operation, the client computing device 203 submits a request message 204 to a cloud-based service 230 on a server side 240, in which private data may be specified as part of the request message 204. This request message 204 is to be processed under HE protocols in order to preserve the privacy of the private data being submitted as part of the request. Thus, the request message 204 is encrypted at the client side 202 computing device 203 prior to sending the request message 204 to the cloud-based services, e.g., cloud based database 210, 212, and 214 via the one or more data networks 220.

This private data in the request may specify certain information that the user of the computing device 203 does not want publicly viewable. In the depicted example, the request message 204 may specify certain filter or search criteria that has a sensitive nature, such as a search for mental health clinics that treat patients with certain types of disorders "X", where X may be any type of disorder that the user is interested in obtaining information about, such as obsessive compulsive disorders, borderline personality disorders, eating disorders, or the like, and which also take the user's specific health insurance, and which are near the user's location. The user of the computing device 203 may not want it publicly viewable that the user potentially has or is concerned with such types of mental health disorders, what the user's health insurance is, that the user is looking for assistance with mental health issues, or even what the user's location is. This is just one example of private data that may need to be encrypted so that it remains private.

The information for servicing the request message 204 may be distributed across one or more cloud based databases 210-214, each of which would need to be searched and results filtered and aggregated in order to return an appropriate response to the original request message 204. With regard to each database 210-214, the records of the database matching the corresponding criteria of the request message 204 will be much smaller than the size of the database 210-214 and thus, the results returned will be sparse. Moreover, it is beneficial to aggregate these results in the cloud-based service 230, which means that the sparse results data from each database 210-214 needs to be communicated to the cloud based service 230 for it to perform the aggregation. Under an HE scheme, as it is not known what the encrypted data represents without decryption to plaintext, both on the client side with the encrypted request message 204 and on the server side with the encrypted database data, all of the records of the databases 210-214 would need to be transmitted to the cloud based server 230 to perform the HE operations for filtering and aggregating the results to determine which records of the databases 210-214 are mental health clinics that treat patients with a particular "X" disorder, which take the user's health insurance, and are near the users' location. Thus, even though the results from each database 210-214 are sparse, the data traffic required to perform the HE operation is quite large.

At the server side 240, one or more artificial intelligence (AI) or machine learning computer models of the cloud service 230 are used to process the encrypted request message 204 and the database 210-214 data, using HE computations to thereby infer an encrypted result 250, e.g., an encrypted listing of the mental health clinics near the user of the computing device 203 which treat patients with "X" disorder and take the user's health insurance. This is done without decrypting the encrypted request message 204 or the data from the databases 210-214, and thus the privacy of the original private data of the request message 204 and the database 210-214 data is preserved.

For example, the original request message 204 may be converted from a SELECT query type, to one or more range queries, for example, and the range query may be processed using partition trees or the like, without learning the value of the records (or points) of the database, or the parameters of the range, i.e., the criteria of the original request message 204. That is, the range query function $f(P \cap \gamma)$ is computed where P refers to points in the database 210, 212, or 214, and $\gamma$ is the range, such that the function determines which points P of the database are within the given range $\gamma$ without decrypting P or $\gamma$. See for example, Kushnir et al., "Secure Range-Searching Using Copy-And-Recurse", Privacy Enhancing Technologies Symposium (PETS) Jul. 15-Jul. 20, 2024, which is hereby incorporated herein by reference. The encrypted result 250 is returned to client computing device 203 of the client side 202, which then decrypts and decodes the encrypted result 250 to obtain the plaintext result.

Under HE/FHE, one cannot compare two encrypted values and cannot make decisions based on comparisons. Thus, this means that these protocols cannot skip any point P of the databases 210, 212, and 214. That is, in plaintext applications, it is possible to check for each point whether it is non-zero and transmit only the non-zero points. This is impossible under FHE where it is impossible to make a decision (branch) based on a condition that depends on the input, i.e., knowing whether the input is non-zero contradicts the semantic security of HE/FHE and therefore is impossible.

Handling branches under HE/FHE may be performed by replacing a branch condition with a set of computations comprising: (1) a computation of a ciphertext Enc(x) where the value x that is encrypted is either 1 if the condition is met or 0 otherwise; (2) computing both branches; and (3) multiplexing by multiplying one branch by the ciphertext Enc(x) and the other branch by (1−Enc(x)). This can be used to add a point p to the output only when the point p is within the given range $\gamma$. However, this must be done for each point p, which is why solutions that work well in plaintext do not extend well to HE/FHE.

Thus, when servicing a request message 204 such as that described above, the illustrative embodiments return results in the form of a binary vector in which a vector slot is present for each record of the corresponding database 210, 212, or 214, and in which the values of vector slots are zeroed for records that do not match the corresponding criteria from the original encrypted request message 204, and have a value of "1" for each of the records that do match the corresponding criteria of the encrypted request message 204. Thus, for example, if database 210 stores information regarding mental health clinics, the HE operation may be performed on the data of the database 210 using the encrypted request message 204 to identify any records matching the criteria specified in the request message 204. The database may generate a sparse vector result, i.e., a vector of n entries, or vector slots, that will have at most c of the entries/slots being non-zero. That is, only a small number of the ciphertexts corresponding to records of the database 210, 212, or 214 satisfy criteria of the request message 204, however since the data is encrypted, it is not known which ciphertexts match the criteria and thus, all of the ciphertexts would need to be transmitted to the cloud service 230.

This is the case for each of the different database 210-214. Even though only a small number of the vector slots are non-zero, the entirety of the vectors generated by each of the databases 210-214 must be transmitted to the cloud service 230 for aggregation and returning the response to the original request message 204. Thus, it would be beneficial to transmit this vector in a more efficient manner using smaller communication sizes and which enables easy encoding/decoding under HE/FHE schemes.

With the mechanisms of the illustrative embodiments, this requirement to perform the HE/FHE computations on each point is overcome by using a combination of level indicator vectors and the leaf node vector, along with algorithms for building a binary tree, to compress the data and focus the operation of the computationally expensive HE/FHE operations on only a subset of the nodes of the binary tree that correspond to leaf nodes that meet the criteria of a filter, search, or other conditional branch. The illustrative embodiments provide a sparse vector compression/decompression engine that operates to perform the compression and decompression of sparse vectors for use with encrypted data operations, such as HE/FHE operations, which minimizes data traffic and transmission times, along with computations and computation times. The sparse vector compression and decompression tool of the illustrative embodiments may be implemented in various distributed and/or cloud based computing environments to improve the processing and transmission of encrypted data, such as under an HE/FHE scheme or protocol.

Figure 3:
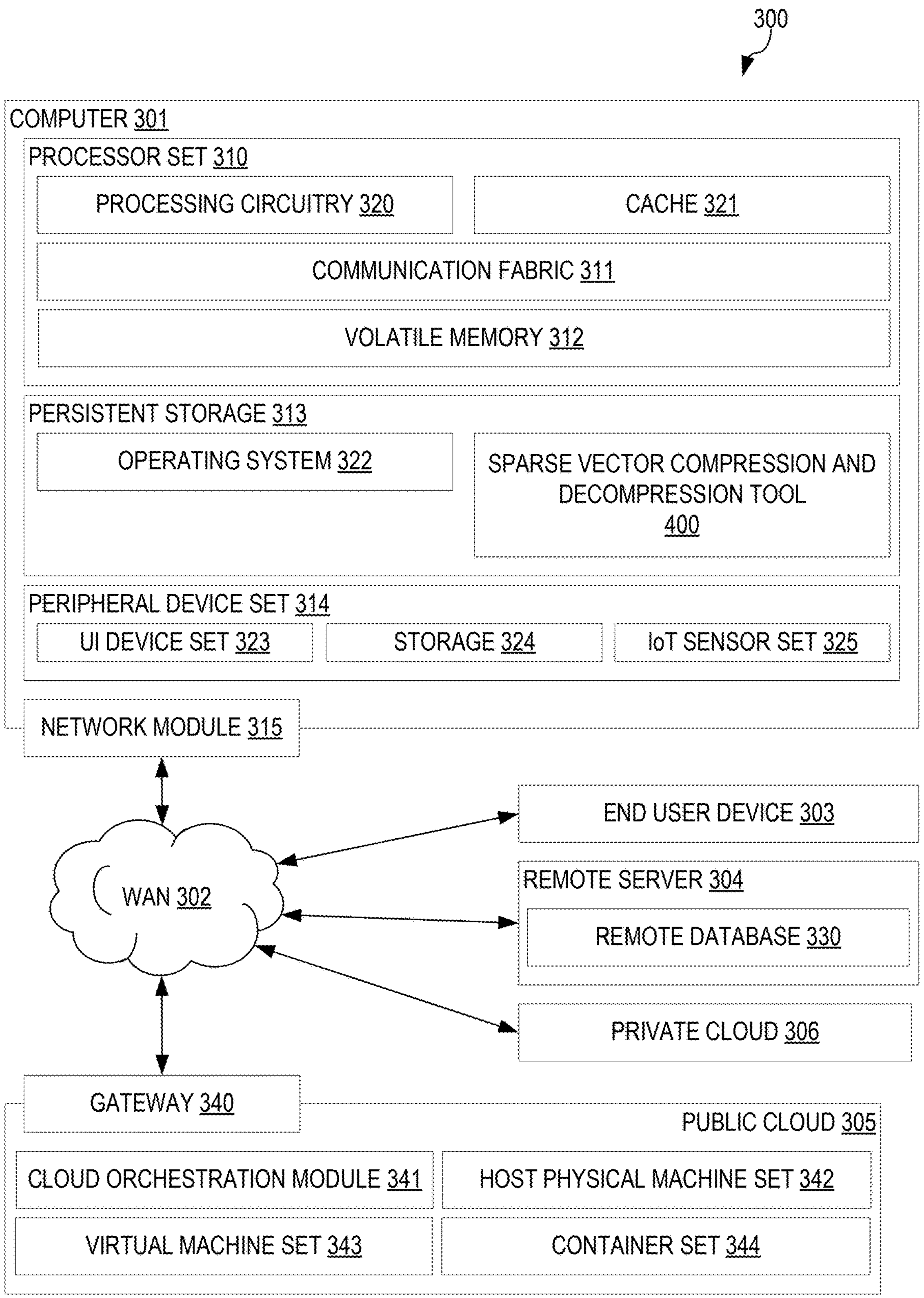
FIG. 3 is an example diagram of a distributed data processing system environment in which aspects of the illustrative embodiments may be implemented and at least some of the computer code involved in performing the inventive methods may be executed.

FIG. 3 is an example diagram of a distributed data processing system environment in which aspects of the illustrative embodiments may be implemented and at least some of the computer code involved in performing the inventive methods may be executed. That is, computing environment 300 contains an example of an environment for the execution of at least some of the computer code involved in performing the inventive methods, such as sparse vector compression and decompression tool 400. In addition to sparse vector compression and decompression tool 400, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and sparse vector compression and decompression tool 400, as identified above), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in sparse vector compression and decompression tool 400 in persistent storage 313.

Communication fabric 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface type operating systems that employ a kernel. The code included in sparse vector compression and decompression tool 400 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

As shown in FIG. 3, one or more of the computing devices, e.g., computer 301 or remote server 304, may be specifically configured to implement a sparse vector compression and decompression tool 400. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 301 or remote server 304, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates sparse vector compression and decompression in a manner that it can be efficiently performed under HE/FHE, and such that the compression/decompression reduces data traffic and computations, which increases the speed at which such transmission and computations may be performed.

Figure 4:
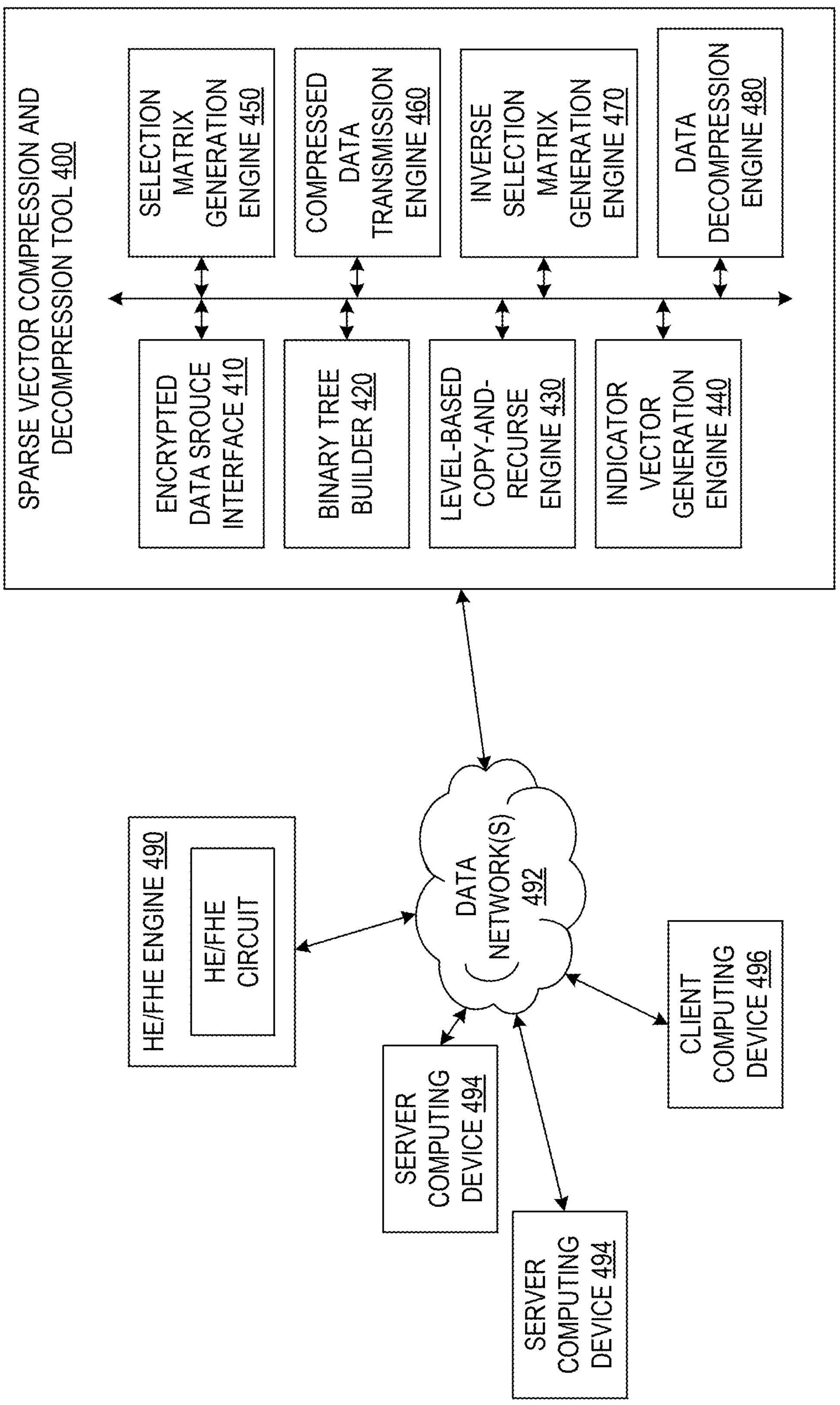
FIG. 4 is an example block diagram illustrating the primary operational components of a sparse vector compression and decompression tool in accordance with one or more illustrative embodiments.

FIG. 4 is an example block diagram illustrating the primary operational components of a sparse vector compression and decompression tool in accordance with one or more illustrative embodiments. The operational components shown in FIG. 4 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., requests for performance of HE/FHE operations, and the resulting output may aid human beings, e.g., results of the HE/FHE operations which service the original request. The invention is specifically directed to the automatically operating computer components directed to improving the way sparse vectors that may be inputs to HE/FHE operations may be compressed/decompressed under HE/FHE or other protocols or schemes that operate to perform computations on encrypted data, so as to reduce data transmissions and required computations and thereby increase speed. Such sparse vector compression and decompression operations, especially under protocols such as HE/FHE, cannot be practically performed by human beings as a mental process and is not directed to organizing any human activity.

As shown in FIG. 4, the sparse vector compression and decompression tool 400 comprises an encrypted data source interface 410, a binary tree builder 420, a level based copy-and-recurse engine 430, an indicator vector generation engine 440, a selection matrix generation engine 450, a compressed data transmission engine 460, an inverse selection matrix generation engine 470, and a data decompression engine 480. The sparse vector compression and decompression tool 400 may operate in conjunction with an HE/FHE engine 490 that implements one or more HE/FHE circuits on the encoded and encrypted data.

The encryption data source interface 410 provides a data communication interface through which encrypted data may be received and sent via one or more data networks 492 and one or more server computing devices 494 and client computing devices 496. The client computing devices 496 may be mobile or stationary computing devices and may submit encrypted requests for services, such as cloud services with which the mechanisms of the illustrative embodiments operate. For example, the sparse vector compression and decompression tool 400 may operate with a location services cloud service and the client computing device 496 may submit a request specifying private data associated with the client computing device 496 or user of the client computing device 496 which is encrypted. In addition, or alternatively, the encrypted data source interface 410 may be used to access encrypted data from one or more of the server computing devices 494, e.g., databases of information which may be used to service requests from client computing devices 496. Although shown as a separate entity from the one or more server computing devices 494 and the HE/FHE engine 490, it should be appreciated that the sparse vector compression and decompression tool 400 may be integrated with one or more of the server computing devices 494 and/or the HE/FHE engine 490 without departing from the spirit and scope of the present invention.

The sparse vector compression and decompression tool 400 receives a sparse vector as input via the interface 410, which is to be transfer to another party, and neither party can decrypt the sparse vector, e.g., the output of a range-search query or the like. In FIG. 2, for example, the compression is implemented at 210, 212, and 214 (compressing 3 different sparse vectors) and the decompression is implemented at 230, where the 3 sparse vectors are decompressed and further computation is performed after decompression.

This sparse vector that is received as input in the sparse vector compression and decompression tool 400 may represent, for example, some result of an operation on a larger set of elements, such as records in one or more databases hosted by the one or more server computing devices 494, e.g., the range-search query operation. The vector is sparse in that the vector slot values indicate that only a much smaller subset of elements, in the larger set of elements, are usable for a particular requested HE/FHE operation. Thus, for example, in a vector having binary vector slot values, only a small number of the vector slots will have a value of 1, meaning that the corresponding ciphertext represents an element that meets criteria of a request, while the vast majority of vector slots have zero values.

Assuming the presence of such a sparse vector, the binary tree builder 420 of the sparse vector compression and decompression tool 400 operates to build a binary tree from the sparse vector, where the sparse vector values are used as leaf nodes for building the binary tree. It is known that the vector has a maximum number of elements that are non-zero, i.e., that meet a given criteria, as noted above. Thus, for example, if the sparse vector is a 4-sparse vector, at most 4 of the vector slots will have a non-zero value. Moreover, at each subsequent level of the binary tree that is built up from the leaf nodes, the maximum number of nodes at each level that are non-zero will also be 4.

Figure 5:
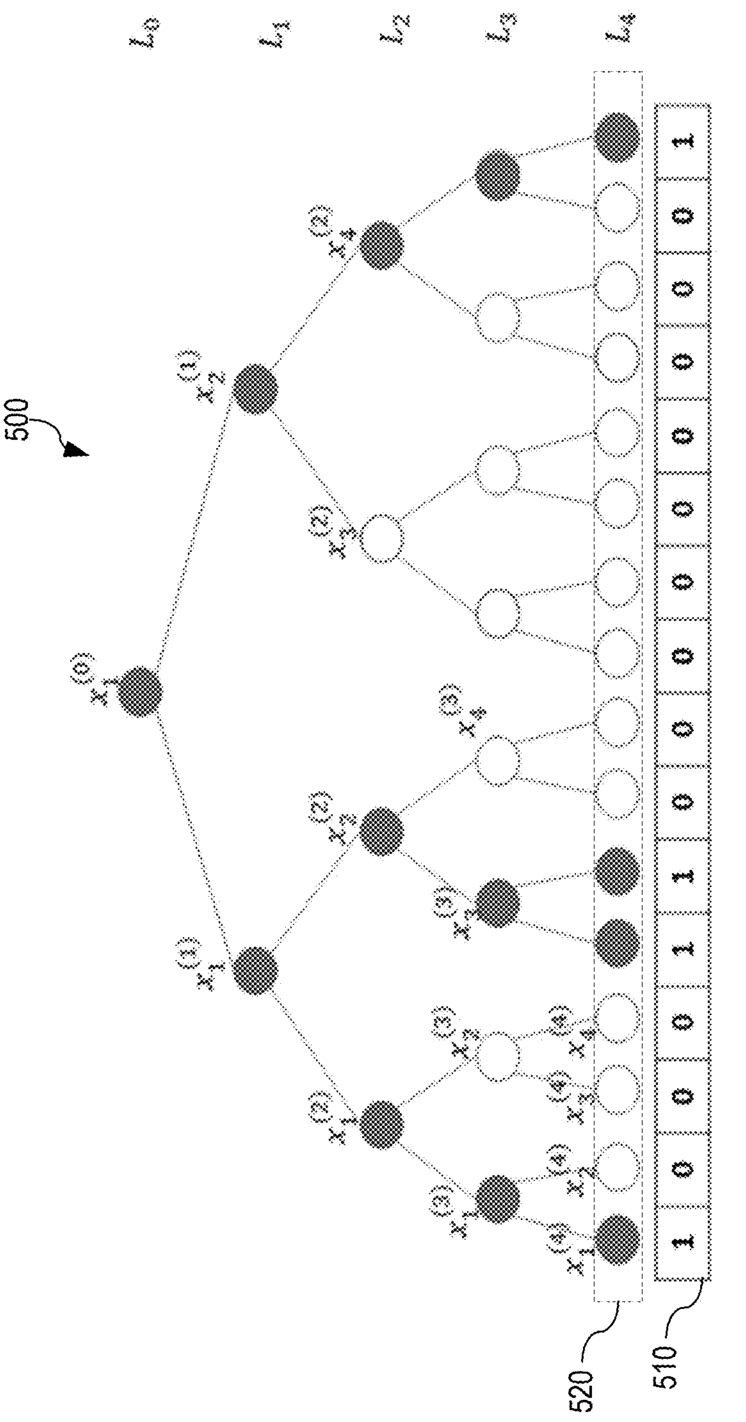
FIG. 5 is an example diagram of a binary tree built from a sparse vector in accordance with one illustrative embodiment.

FIG. 5 is an example diagram of a binary tree built from a sparse vector in accordance with one illustrative embodiment. It should be appreciated again that the nodes of the binary tree correspond to ciphertexts. Each node may also have an indicator value that is a binary value of either a 0 or 1 indicating whether the corresponding node's ciphertext has some relationship with a ciphertext in the sparse vector 510 indicated as meeting the particular request criteria, i.e., a leaf node having a value of "1". In the depicted example, the sparse vector 510 is a 4-sparse vector such that at most 4 vector slots of the vector will have a non-zero value. The vector slots of the sparse vector 510 are used to set the binary leaf nodes 520 of the binary tree data structure 500 and the values of those leaf nodes 520. In the depicted example, nodes that are shaded are considered to have a value of "1" and are nodes that are to be visited by an algorithm A that follows the paths of all non-zero leaves.

In building the binary tree data structure 500, for each pair of leaf nodes, in a next higher level of the binary tree data structure 500, a parent node, or inner node, is generated and its value is set based on the values of the child nodes. Thus, for example, if one or both of the child nodes has a value of "1", i.e., is shaded in the depicted example, then the parent or inner node at the next higher level is set to a value of "1" (shaded). If neither of the child nodes has a value of 1, then the parent or inner node is set to a value of 0 (not shaded). This process continues from the leaf node level L4 up to the root node level L0. Thus, if there is a plaintext algorithm A that follows the paths of all non-zero leaves, then at every level, the algorithm A visits at most 4 nodes in this 4-sparse vector based binary tree 500. Again, in the case of sparse vectors, it is known that at most c nodes in each level of the generated binary tree will need to be visited by the HE/FHE algorithms, i.e., at most c nodes in each level have a corresponding value of "1", and at each subsequent level, there are 2c potential nodes in the next level (of which still only c would need to be visited), due to the way the binary tree is constructed.

Returning to FIG. 4, having built the binary tree from the sparse vector, the level based copy-and-recurse engine 430 operates, in conjunction with the indicator vector generation engine 440 and a selection matrix generation engine 450, to generate the indicator vectors that may be used to compress the data of the binary tree for compressed transmission of the data. With the copy-and-recurse operation, the binary tree is traversed by the level-based copy-and-recurse engine 430 from the root node to the leaf nodes of the binary tree data structure, performing the copy-and-recurse operation as outlined previously above. When visiting a node in the binary tree data structure T, e.g., binary tree data structure 500 in FIG. 5, the level-based copy-and-recurse engine 430 calls the indicator vector generation engine 440 to perform operations to generate an indicator vector for the level, under HE/FHE, where the indicator vector indicates which children need to be recursed into, i.e., the same process is repeated on such child nodes. There are at most c children that need to be recursed into. The indicator vector is used by the selection matrix generation engine 450 to construct a selection matrix to generate a copy of the c children, and the operation recurses into the copies of the c children.

Figure 6:
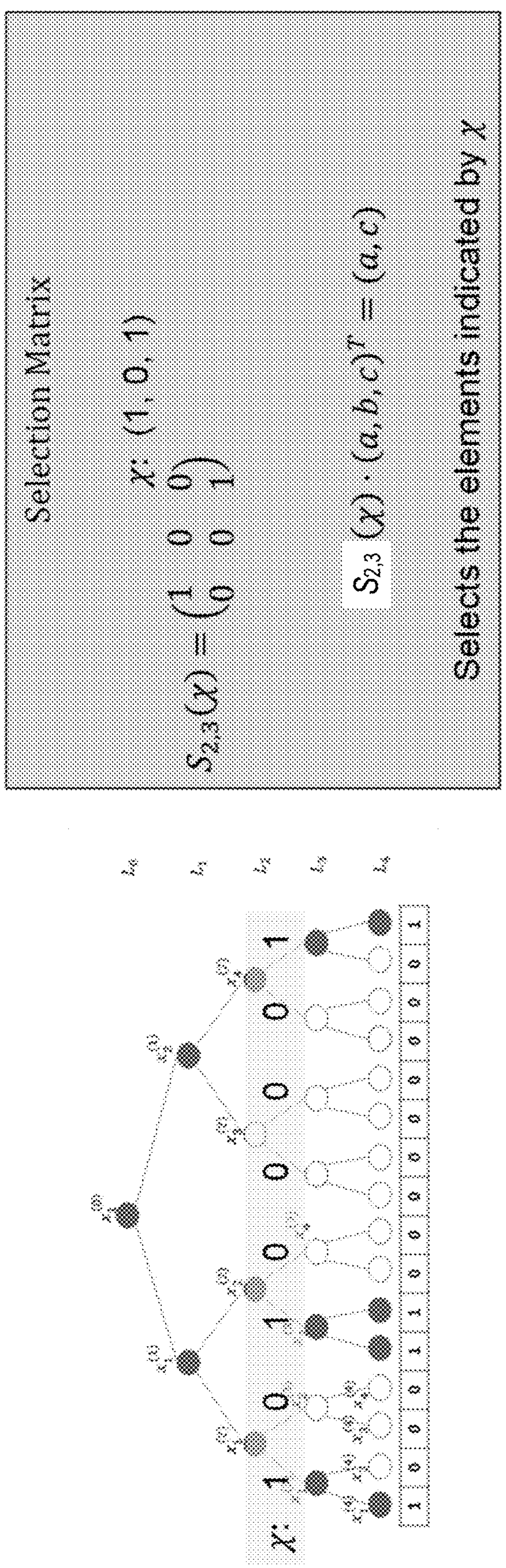
FIG. 6 is an example diagram illustrating an indicator vector and selection matrix for a given level of the binary tree built from the sparse vector in accordance with one illustrative embodiment.

FIG. 6 is an example diagram illustrating an indicator vector and selection matrix for a given level of the binary tree built from the sparse vector in accordance with one illustrative embodiment. As shown in FIG. 6, the indicator vector X is generated to indicate which nodes of the current level, e.g., level L3, have values indicating that those nodes are to be visited. In the depicted example, nodes x1, x3, and x8 are nodes that are to be visited because they have non-zero values due to the values of the child (leaf) nodes. In the depicted example, the indicator vector for level L3 is X: (1, 0, 1, 0, 0, 0, 0, 1).

Thus, at each level of the generated binary tree, the values of the nodes of that level represent an indicator vector (X) for recursion, which is used to build the selection matrix S(X). That is, under HE/FHE it is determined which children need to be recursed into and a binary indicator vector $X=(X_1, \ldots, X_r)$ of r indicator bits is computed by the indicator vector generation engine 440, where $X_i=1$ if and only if the operation needs to recurse into the i-th child. The selection matrix generator engine 450 builds the selection matrix S(X) so that it can be used to generate, under HE/FHE, a copy of the children (and their subtrees) that need to be recursed into. Only copies of c<r children are copied since at most c children need to be recursed into, e.g., c=4 in the depicted example. Under HE/FHE, this is done by multiplying the vector of children by the selection matrix S(X). That is, for example, if the indicator vector X has values (a, b, c), of which only a and c are to be recursed into, e.g., have values of 1, then S(X)*(a, b, c)=(a, c), i.e., the selection matrix S(X) selects the elements indicated by X and the other nodes not indicated by X are eliminated.

After generating the selection matrix and using it to make copies of the children, the operation recurses into the copied child sub-trees by going back to the determination of which children need to be recursed into, building a new selection matrix, and repeating with the root of each sub-tree. This process is repeated until a leaf level is reached. Thus, at each node it is determined which sub-tree to recurse into by computing the value of a comparison, e.g., computing the indicator vector X, and then multiplying by a selection matrix S(X) to copy that sub-tree.

The nodes selected by the copy-and-recurse operation, using the multiplication with the selection matrix S(X), identifies the nodes upon which the more expensive computations are performed, while removing the nodes for which expensive computations should not be performed, e.g., HE/FHE computations. Hence, the copy-and-recurse operation allows an algorithm, e.g., plaintext algorithm A, to be run under HE/FHE such that the additional work for HE/FHE is performed on the same number of noes as a plaintext algorithm A. The extra costs of running under HE/FHE with copy-and-recurse are only the cost of multiplying by the selection matrix S(X).

Having traversed the binary tree data structure using the copy-and-recurse operations of the level-based copy-and-recurse engine 430 to generate indicator vectors for each level, the compressed data transmission engine 460 collects the indicator vectors for each level and transmits those indicator vectors and the original vector of the leaf nodes. As will be shown hereafter, with only the indicator vectors and the original vector of leaf nodes, the binary tree data structure may be rebuilt and used to perform HE/FHE operations on the selected nodes of the binary tree data structure. Thus, rather than having to transmit all the ciphertexts for performing the HE/FHE operations, only the ciphertexts indicated by the indicator vectors and the non-zero elements of the leaf node vector need to be transmitted. This significantly compresses the amount of data that needs to be transmitted.

For example, assume that there is a 32K 4-sparse vectors of 32K slots each. Using a naïve approach, this would require that all 32K ciphertexts be transmitted to the HE/FHE engine 490 for processing by the one or more HE/FHE circuits. With the mechanisms of the illustrative embodiments, since the vectors are 4-sparse vectors, at most 4 leaf nodes in the leaf node vector will have non-zero values and thus, only those 4 ciphertexts need to be transmitted. In addition, only 15 indicator vectors are needed having at most 2c, e.g., 8 in this example, nodes represented in the indicator vectors, leading to 15*8=120 ciphertexts. Thus, without the present invention 32K ciphertexts would need to be transmitted with an approximate time of transmission being around 3300 seconds. With the present invention, even including the time required for the various additional computations of computing selection matrices, copying sub-trees, bootstrapping, computing inverse selection matrices, and copying when reconstructing the binary tree data structure, it is estimated that the operation requires only approximately 2400 seconds. This provides a 900 second, or approximately 15 minute, improvement over approaches that do not utilize the present invention.

In order to decompress data that has been compressed in the manner above, the data decompression engine 480 utilizes an inverse selection matrix generation engine 470 to generate an inverse of the selection matrix S(X), i.e., Z=ST. This decompression may be performed prior to processing the ciphertexts, so as to decompress the compressed data and recreate the tree data structure, filling in the missing nodes and ciphertexts from the compressed data. Thus, while the data decompression engine 480 is shown as being part of the same tool 400 as the data compression mechanisms, these may be distributed from one another and may be implemented on different computing devices. Moreover, each computing device may implement both the compression and decompression mechanisms and may invoke them for compression/decompression as needed when transmitting sparse vector ciphertexts in accordance with the illustrative embodiments, i.e., using the compression elements when the computing device is a sender of a sparse vector, and using the decompression elements when the computing device is a recipient of other sparse vectors.

Figure 7:
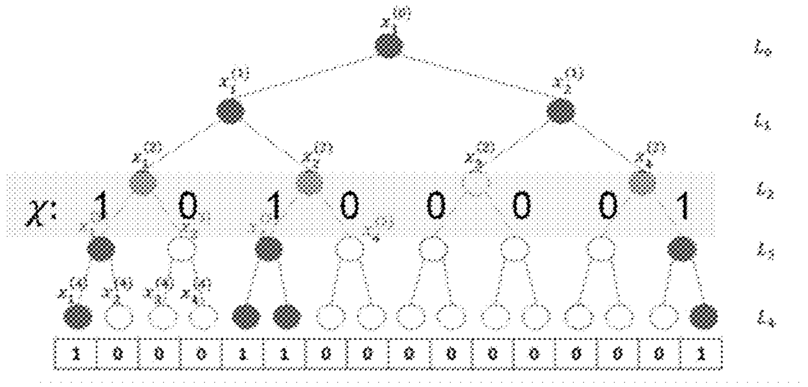
FIG. 7 is an example diagram illustrating the generation of an inverse selection matrix for decompression in accordance with one illustrative embodiment.

FIG. 7 is an example diagram illustrating the generation of an inverse selection matrix for decompression in accordance with one illustrative embodiment. As shown in FIG. 7, the inverse selection matrix Z is the transpose of the selection matrix. The inverse selection matrix Z is used to traverse the tree data structure from the small subset of leaves upwards where at each level the inverse selection matrix Z is applied to generate the next higher level of the binary tree. This is essentially an inverse operation of the copy-and-recurse operation which traverses the tree from top to bottom to determine the nodes, and thus the ciphertexts, that need to be recursed into and hence, transmitted. Instead, the inverse selection matrix identifies the nodes and ciphertexts including those that were not present in the compressed data transfer, essentially "filling in the blanks" of the ciphertexts that were determined to not meet the criteria of a request. These blanks may be filled with "0" or "don't care" ciphertexts upon which a non-expensive operation is performed, whereas the more expensive (computationally) HE/FHE operations are performed on the ciphertexts corresponding to the non-zero values of the indicator vectors. Thus, the copy-and-recurse operation is modified to traverse the tree data structure from the leaf nodes up and, in the step where the selection matrix is generated, instead generates an inverted selection matrix. Multiplying the inverted selection matrix Z by the transpose of the indicator vector at each level of the tree givens the full set of nodes (ciphertexts) for the next level up the tree data structure. Thus, the decoding step takes the inverted selection matrices and reconstructs the binary tree from the leaves upwards. Since the decoding step involves only matrix vector multiplications, it is efficient for implementation under HE/FHE operations.

The sparse vector compression and decompression tool 400 may operate in conjunction with an HE/FHE engine 490 that implements one or more HE/FHE circuits on the encoded and encrypted data. That is, a signification purpose to the present invention is to reduce the data traffic required for performance of HE/FHE operations by HE/FHE circuits. That is, rather than having to transmit all the ciphertexts of, for example, all the records of a database, the sparse vector is used as a mechanism to identify a subset of these records and thus, a subset of the ciphertexts, that are actually needed to be processed by the HE/FHE circuits. That is, when it can be determined under HE/FHE which are the few records that need to be transmitted, then the illustrative embodiments are able to reduce the data traffic by transmitting only the required elements and indicator vectors as noted above. Thus, the illustrative embodiments compress the ciphertexts to only those indicated by the indicator vectors and the original sparse vector. The compressed data of these select ciphertexts may be transmitted to the HE/FHE engine 490 where the compressed data is then decompressed by the mechanisms of the illustrative embodiments to thereby provide the necessary ciphertexts for the HE/FHE engine 490. This process may then be repeated with the resulting data if the resulting data is also a sparse so as to transmit the results back to the originator of the request. Hence, significant reduction in data traffic is achieved which reduces bandwidth requirements and increases the speed of the transmissions and the performance of the HE/FHE computations by the HE/FHE engine 490.

FIG. 8 is an example diagram illustrating an example algorithm for performing compression under HE/FHE in accordance with one illustrative embodiment. As shown in FIG. 8, the compression algorithm (Algorithm 1) has 2 parameters n>0 which is assumed to be a power of 2 and 0<c<<n. The compression algorithm also receives as input a c-sparse array A of size n. That is, A has n elements of which at most c are non-zero. As discussed herein, the compression algorithm first constructs a binary tree T with A stored in its leaves. In addition, every node in T keeps a binary value (indicator) that indicates whether there is a non-zero element of A in its subtree. The algorithm then uses c-level copy-and-recurse as described herein to efficiently record and transmit the c paths to the non-zero leaves.

In more detail, the compression algorithm (Algorithm 1) starts by constructing a binary tree. It starts by constructing the bottom-most level $L_0$ (i.e., the leaves) (Lines 3-4) where n leaves are initialized and leaf $L_0[a]$ is associated with A[a] by setting $L_0[a]\cdot val=A[a]$. In addition, the algorithm sets the indicator $L_0[a]\cdot\chi$ to be 1 if A[a] is non-zero and 0 otherwise. Specifically, this is done by using the function isNonZero. After having initialized the leaf level Algorithm 1 moves upwards constructing the nodes in level $L_l$ from the nodes in the level below it $L_{l-1}$ as follows. The nodes in $L_{l-1}$ are paired together and for each of nodes pair $L_{l-1}[2a-1]$ and $L_{l-1}[2a]$ the algorithm creates a node $L_l[a]$ for their parent. The algorithm constructs the structure of the tree by setting $L_{l-1}[2a-1]$ as the left child of $L_l[a]$ and $L_{l-1}[2a]$ as its right child (Line 9). The tree structure is not encrypted, that means the parent-child relation of nodes are known, which is why the algorithm does not use the [[·]] notation. For each node, the indicator $L_l[a]\cdot\chi$ is set which indicates whether there is a nonzero value in one of the leaves in the subtree of $L_l[a]$ by setting $L_l[a]\cdot\chi=L_{l-1}[2a-1]\cdot\chi+L_{l-1}[2a]\cdot\chi-L_{l-1}[2a-1]\cdot\chi\cdot L_{l-1}[2a]\cdot\chi$. Since $L_{l-1}[2a-1]\cdot\chi$, $L_{l-1}[2a]\cdot\chi\in\{0, 1\}$ it can be verified that $L_l[a]\cdot\chi=1$ if, and only if, at least one of the indicators of the children is 1 (i.e., there is a non-zero value in at least one of the sub-trees). As described herein, Algorithm 1 does not use the top-most $\lfloor \log c \rfloor$ levels, hence the construction of the tree stops at level L log n−$\lfloor \log c \rfloor$. In this case there is a forest of 2c trees, but they are still considered as 2*c* sub-trees of the same single tree.

Next, Algorithm 1 traverses the tree from top to bottom. It starts at level log n−$\lfloor \log c \rfloor$ which has at most c nodes and considers all of them for further processing (denoted by L'log n−$\lfloor \log c \rfloor$). At each level (the algorithm processes $L'_l$ (that is shown below has c nodes) as follows. Consider the 2c children of the nodes of $L'_l$, and denote by $\chi_l$ the vector of their indicators (Line 12).

Algorithm 1 constructs the selection matrix Se from this vector (Line 13) and uses it to copy c children thus constructing $L'_{l-1}$ (Line 14). Here $[[S_l]]\cdot[[L'_l]]$ means the algorithm multiplies the matrix S by a vector $L'_l$ where its elements are the entire subtrees rooted at $L'_l[1]\cdot$left, $L'_l[1]\cdot$right, . . . , $L'_l[c]\cdot$left, $L'_l[c]\cdot$right. The product is a vector of c subtrees. The traversal terminates when $L'_0$ is constructed, that is the c leaves whose associated values are non-zero. Finally, the algorithm transmits the values of the nonzero leaves $L'_0$ 1]·val, . . . , $L'_0[c]\cdot$val as well as the indicator vectors χ log n−$\lfloor \log c \rfloor$, . . . , $\chi_1$.

FIG. 9 is an example diagram illustrating an example algorithm for performing decompression under HE/FHE in accordance with one illustrative embodiment. The decompression algorithm (Algorithm 2) is the inverse of Algorithm 1 in the sense that Decomp(Comp(A))=A, when A is c-sparse. Specifically, Algorithm 2 has parameters n, c as Algorithm 1. The input of Algorithm 2 is the output of Algorithm 1 when applied on a c-sparse array A with n elements. Specifically, that is c values A'[1], . . . , A'[c] and indicator vectors $\chi_1$, . . . , χ log n−$\lfloor \log c \rfloor \in \{0, 1\}$ 2c.

The algorithm works iteratively to building a binary tree similar to that Algorithm 1 uses. It starts from the leaf-level. At each level, Algorithm 2 keeps only c subtrees and uses the indicator vectors in the input in a process that is an inverse to copy-and-recurse to build upwards the levels of the tree. Similar to Algorithm 1, the construction of the tree stops at level log n−$\lfloor \log c \rfloor$. Although this is a forest of 2 $\lfloor \log c \rfloor$ trees, it is regarded as the sub-trees of a single binary tree of size n.

In more details, the decompression algorithm starts by setting the values of the leaf nodes $V_0[a]\cdot$val=A'[a], for a=1, . . . , c. Then the decompression algorithm (Algorithm 2) uses $V_l$ and $\chi_l$ to construct $V_{l-1}$ as follows. First, Algorithm 2 constructs the expansion matrix $Z_l$ from $\chi e^{ll}$ (Line 4) then the algorithm multiplies $Z_l$ by $V_l$ (Line 5). This effectively expands Ve into $V'_l$ by adding zero elements so $V'_l=(L'_l[1]\cdot$left, $L'_l[1]\cdot$right, . . . , $L'_l[c]\cdot$left, $L'_l[c]\cdot$right), where $L'_l[a]$ are the sub-trees constructed by the corresponding call to Algorithm 1. Then, the decompression algorithm builds the tree structure by pairing sub-trees and setting each pair as the children of a mutual parent (Lines 6-7). Finally, there are 2 $\lfloor \log c \rfloor$ sub-trees each with n/c leaves. At this point the decompression algorithm outputs the leaves in these sub-trees (Line 8).

Thus, the illustrative embodiments provide an improved computing tool and improved computing tool operations/functionality for compressing and decompressing data corresponding to a sparse vector in manner that facilitates schemes or protocols where computations are performed on encrypted data, such as HE/FHE. The illustrative embodiments provide mechanisms which determine which ciphertexts need to be transmitted in a compressed manner, based on a given sparse vector, by building a binary tree data structure from the sparse vector and performing a copy-and-recurse operation that generates indicator vectors X for each of the levels of the binary tree data structure and a selection matrix for determining how to recurse into subsequent nodes of the tree data structure. With the mechanisms of the illustrative embodiments, the indicator vectors X for each level of the tree may be transmitted rather than having to transmit the ciphertexts for each node. The selection matrix S, with a vector of children node values provides an indication of which child nodes need to be visited. Thus, with a combination of the level indicator vectors X and the leaf node values, e.g., the original vector, it can be determined which nodes (and their corresponding ciphertexts) of the binary tree need to be processed using HE/FHE computations and which nodes can be effectively skipped, thereby saving computation time and resources. Moreover, the size of the indicator vectors and leaf node vectors are substantially smaller than that of the ciphertexts which would otherwise need to be transmitted in the case of systems where the illustrative embodiments are not implemented, and HE/FHE would need to be performed on each node of the tree since it is not known which nodes meet the criteria of the original request. That is, the illustrative embodiments enable a small communication size for HE/FHE operations that involves only c leaves and log n indicator vectors, giving a total size of O(c log n). Furthermore, the illustrative embodiments also provide operations to generate an inverse selection matrix that is used to decode the indicator vectors and original leaf node vector to recreate the binary tree under HE/FHE and thereby decompress the indicator vectors and leave node vector into the full binary tree data structure and corresponding ciphertexts.

Figure 10:
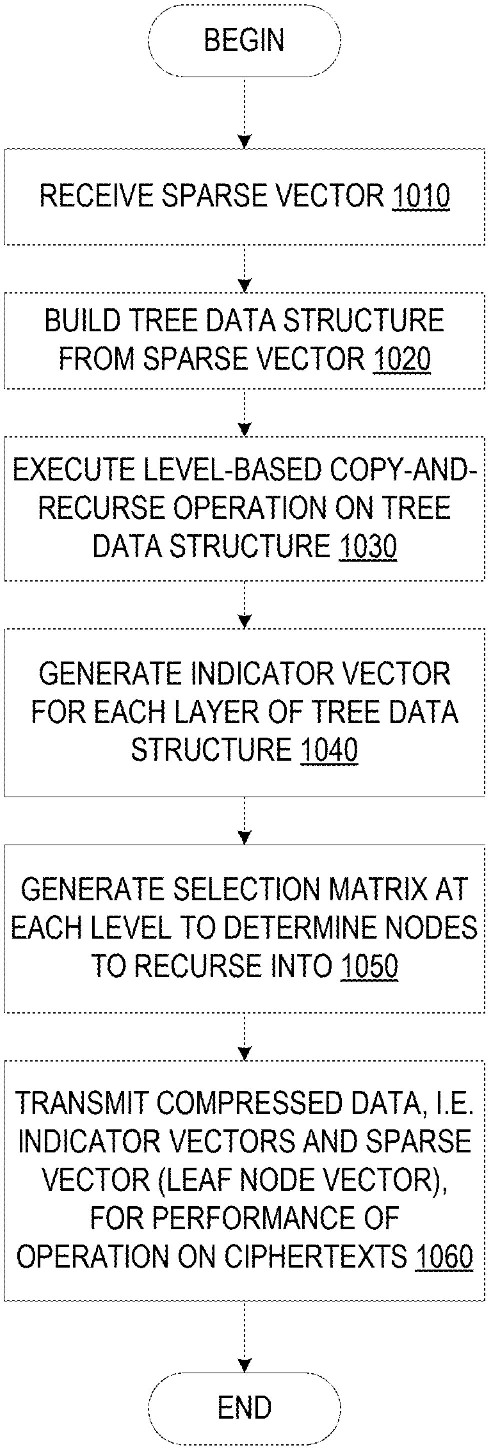
FIG. 10 is an example flowchart outlining an example operation for compressing a sparse vector in accordance with one illustrative embodiment.
Figure 11:
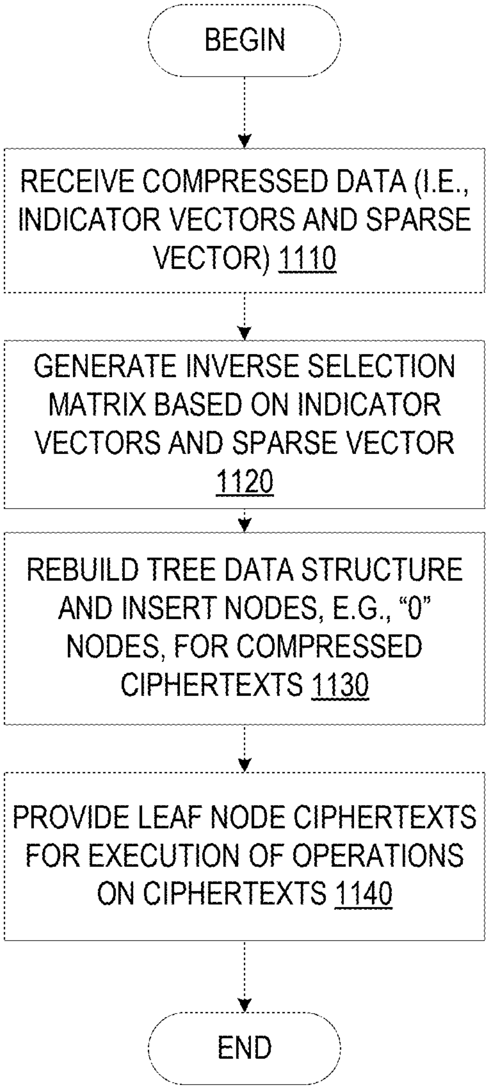
FIG. 11 is an example flowchart outlining an example operation for decompressing a sparse vector in accordance with one illustrative embodiment.

FIGS. 10-11 present flowcharts outlining example operations of elements of the present invention with regard to one or more illustrative embodiments. It should be appreciated that the operations outlined in FIGS. 10-11 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 10-11, and may, in some cases, make use of the results generated as a consequence of the operations set forth in FIGS. 10-11, the operations in FIGS. 10-11 themselves are specifically performed by the improved computing tool in an automated manner.

FIG. 10 is an example flowchart outlining an example operation for compressing a sparse vector in accordance with one illustrative embodiment. As shown in FIG. 10, the operation starts by receiving a sparse vector as input (step 1010). A binary tree data structure is built from the sparse vector by recursively adding inner nodes of a next higher level for each pairing of nodes in a child level and setting the value of the inner node based on the values of the child nodes (step 1020). Once the binary tree data structure is generated, a level-based copy-and-recurse operation is executed on the tree data structure from the root node to the leaf nodes (step 1030). At each level of the tree data structure, an indicator vector is generated based on the values of the nodes of that level (step 1040). A selection matrix is generated based on the indicator vector and is used to determine which nodes to recurse into based on a multiplication of the selection matrix with the ciphertexts of the given level (step 1050). The indicator vectors for each level and the sparse vector are then transmitted for use in performing a HE/FHE operation (step 1060). The operation then terminates.

FIG. 11 is an example flowchart outlining an example operation for decompressing a sparse vector in accordance with one illustrative embodiment. As shown in FIG. 11, the operation starts by receiving indicator vectors and a sparse vector for performance of an HE/FHE operation (step 1110). Based on the indicator vectors and the sparse vector, an inverse selection matrix is generated (step 1120). The inverse selection matrix is applied recursively to each level, starting with the sparse vector that serves as the leaf nodes of the tree data structure, to thereby rebuild the tree data structure and insert nodes that were compressed (step 1130). The resulting leaf node ciphertexts of the tree data structure are then provided to the HE/FHE circuit for processing (step 1140). The operation then terminates.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for compressing ciphertext data for data transmission under homomorphic encryption (HE) or fully homomorphic encryption (FHE), the method comprising:

receiving, without decrypting to plain text, a sparse vector comprising a plurality of vector elements;

building a tree data structure from the sparse vector, wherein the tree data structure is built from a leaf node level in which each leaf node corresponds to a vector element in the sparse vector, and each subsequent level of the tree data structure is built from a child level below it in the hierarchy of the tree data structure, where nodes of a subsequent level have values determined based on values of child nodes connected to them from the child level of the subsequent level;

executing a level-based copy-and-recurse operation on the tree data structure from a root node of the tree data structure to leaf nodes of the leaf node level, wherein the level-based copy-and-recurse operation computes, at each level of the tree data structure, an indicator vector and a selection matrix that identifies which nodes to recurse into;

generating compressed ciphertext data based on the indicator vectors and the sparse vector, the compressed ciphertext data having fewer encrypted coordinates than the sparse vector; and transmitting the compressed ciphertext data to a computing device for execution of one or more operations on the compressed ciphertext data.

2. The method of claim 1, wherein the compressed ciphertext data comprises ciphertexts corresponding to a subset of the leaf nodes of the leaf node level, less than all of the leaf nodes of the leaf node level, and the indicator vectors.

3. The method of claim 2, wherein the subset of leaf nodes comprises leaf nodes having a non-zero values in corresponding vector elements of the sparse vector.

4. The method of claim 2, wherein the computing device decompresses the compressed ciphertext data at least by:

generating an inverse selection matrix to rebuild the tree data structure from the ciphertexts in the compressed ciphertext data, based on the indicator vectors in the compressed ciphertext data; and rebuilding the tree data structure using an inverse copy-and-recurse operation that uses the inverse selection matrix to generate nodes in a next higher level of the rebuilt tree data structure from nodes in a current level of the rebuilt tree data structure.

5. The method of claim 1, wherein the value of a node of the subsequent level is set to a first value if any of that node's child nodes have the first value, and is set to a second value if none of the node's child nodes have the first value.

6. The method of 1, wherein the level-based copy-and-recurse operation traverses from the root node to only non-zero leaf nodes in the leaf node level to generate the indicator vectors.

7. The method of claim 1, wherein the building of the tree data structure and the level-based copy-and-recurse operation have a limit parameter specifying a maximum number of non-zero nodes at each level of the tree data structure, and which specifies a maximum number of nodes to recurse into at each level of the tree data structure.

8. The method of claim 1, wherein the selection matrix generates a copy of the child nodes that need to be recursed into and their sub-trees.

9. The method of claim 1, wherein the one or more operations executed on the compressed ciphertext data comprises at least one homomorphic encryption computation on ciphertexts in the compressed ciphertext data.

10. The method of claim 9, wherein the sparse vector comprises results of a database query, wherein the database stores confidential information, and wherein there is a vector element for each record of the database such that a non-zero value in the sparse vector indicates a database record that meets criteria of the database query.

11. A computer program product comprising a computer readable storage medium having a computer readable program stored therein, wherein the computer readable program, when executed in a data processing system for compressing ciphertext data for data transmission under homomorphic encryption (HE) or fully homomorphic encryption (FHE), causes the data processing system to:

receive, without decrypting to plain text, a sparse vector comprising a plurality of vector elements;

build a tree data structure from the sparse vector, wherein the tree data structure is built from a leaf node level in which each leaf node corresponds to a vector element in the sparse vector, and each subsequent level of the tree data structure is built from a child level below it in the hierarchy of the tree data structure, where nodes of a subsequent level have values determined based on values of child nodes connected to them from the child level of the subsequent level;

execute a level-based copy-and-recurse operation on the tree data structure from a root node of the tree data structure to leaf nodes of the leaf node level, wherein the level-based copy-and-recurse operation computes, at each level of the tree data structure, an indicator vector and a selection matrix that identifies which nodes to recurse into;

generate compressed ciphertext data based on the indicator vectors and the sparse vector, the compressed ciphertext data having fewer encrypted coordinates than the sparse vector; and transmit the compressed ciphertext data to a computing device for execution of one or more operations on the compressed ciphertext data.

12. The computer program product of claim 11, wherein the compressed ciphertext data comprises ciphertexts corresponding to a subset of the leaf nodes of the leaf node level, less than all of the leaf nodes of the leaf node level, and the indicator vectors.

13. The computer program product of claim 12, wherein the subset of leaf nodes comprises leaf nodes having a non-zero values in corresponding vector elements of the sparse vector.

14. The computer program product of claim 12, wherein the computing device decompresses the compressed ciphertext data at least by:

generating an inverse selection matrix to rebuild the tree data structure from the ciphertexts in the compressed ciphertext data, based on the indicator vectors in the compressed ciphertext data; and rebuilding the tree data structure using an inverse copy-and-recurse operation that uses the inverse selection matrix to generate nodes in a next higher level of the rebuilt tree data structure from nodes in a current level of the rebuilt tree data structure.

15. The computer program product of claim 11, wherein the value of a node of the subsequent level is set to a first value if any of that node's child nodes have the first value, and is set to a second value if none of the node's child nodes have the first value.

16. The computer program product of 11, wherein the level-based copy-and-recurse operation traverses from the root node to only non-zero leaf nodes in the leaf node level to generate the indicator vectors.

17. The computer program product of claim 11, wherein the building of the tree data structure and the level-based copy-and-recurse operation have a limit parameter specifying a maximum number of non-zero nodes at each level of the tree data structure, and which specifies a maximum number of nodes to recurse into at each level of the tree data structure.

18. The computer program product of claim 11, wherein the selection matrix generates a copy of the child nodes that need to be recursed into and their sub-trees.

19. The computer program product of claim 11, wherein the one or more operations executed on the compressed ciphertext data comprises at least one homomorphic encryption computation on ciphertexts in the compressed ciphertext data.

20. An apparatus for compressing ciphertext data for data transmission under homomorphic encryption (HE) or fully homomorphic encryption (FHE) comprising:

at least one processor; and at least one memory coupled to the at least one processor, wherein the at least one memory comprises instructions which, when executed by the at least one processor, cause the at least one processor to:

receive, without decrypting to plain text, a sparse vector comprising a plurality of vector elements;

build a tree data structure from the sparse vector, wherein the tree data structure is built from a leaf node level in which each leaf node corresponds to a vector element in the sparse vector, and each subsequent level of the tree data structure is built from a child level below it in the hierarchy of the tree data structure, where nodes of a subsequent level have values determined based on values of child nodes connected to them from the child level of the subsequent level;

execute a level-based copy-and-recurse operation on the tree data structure from a root node of the tree data structure to leaf nodes of the leaf node level, wherein the level-based copy-and-recurse operation computes, at each level of the tree data structure, an indicator vector and a selection matrix that identifies which nodes to recurse into;

generate compressed ciphertext data based on the indicator vectors and the sparse vector, the compressed ciphertext data having fewer encrypted coordinates than the sparse vector; and transmit the compressed ciphertext data to a computing device for execution of one or more operations on the compressed ciphertext data.

* * * * *